United States Patent
de la Iglesia (10) Patent No.: US 9,344,525 B2
(45) Date of Patent: May 17, 2016

(54) METHOD AND APPARATUS FOR DATA MIGRATION

(71) Applicant: VIOLIN MEMORY INC., Santa Clara, CA (US)

(72) Inventor: Erik de la Iglesia, San Jose, CA (US)

(73) Assignee: VIOLIN MEMORY INC., Santa Clara, CA (US)

(*) Notice: Subject to any disclaimer, the term of this patent is extended or adjusted under 35 U.S.C. 154(b) by 295 days.

(21) Appl. No.: 14/089,370

(22) Filed: Nov. 25, 2013

(65) Prior Publication Data

US 2015/0149605 A1    May 28, 2015

(51) Int. Cl.
*G06F 15/173*    (2006.01)
*H04L 29/08*    (2006.01)
*G06F 3/06*    (2006.01)

(52) U.S. Cl.
CPC .............. *H04L 67/322* (2013.01); *G06F 3/067* (2013.01); *G06F 3/0617* (2013.01); *G06F 3/0647* (2013.01); *H04L 67/1097* (2013.01)

(58) Field of Classification Search
CPC ..... H04L 67/322; G06F 3/0647; G06F 3/067; G06F 3/0617
See application file for complete search history.

(56) References Cited

U.S. PATENT DOCUMENTS

| | | | | |
|---|---|---|---|---|
| 5,742,792 A * | 4/1998 | Yanai et al. | ................ | 711/162 |
| 5,887,146 A * | 3/1999 | Baxter et al. | ................ | 710/104 |
| 7,120,824 B2 * | 10/2006 | Burton et al. | ................ | 714/6.23 |
| 7,603,529 B1 * | 10/2009 | MacHardy et al. | ........... | 711/162 |
| 2004/0123052 A1 * | 6/2004 | Beers et al. | ................ | 711/150 |
| 2006/0224844 A1 * | 10/2006 | Kano et al. | ................ | 711/162 |
| 2006/0236056 A1 * | 10/2006 | Nagata | ................ | 711/165 |
| 2007/0130382 A1 * | 6/2007 | Moll et al. | ................ | 710/22 |
| 2008/0147934 A1 * | 6/2008 | Nonaka et al. | ................ | 710/74 |
| 2010/0211742 A1 * | 8/2010 | Turullols et al. | ................ | 711/119 |

* cited by examiner

Primary Examiner — Michael Y Won
(74) *Attorney, Agent, or Firm* — Brinks Gilson & Lione (57) ABSTRACT

A system and method of managing the storage of data in a data system when data is to be migrated between a first data system and a second data system is disclosed. A plurality of storage processors is disposed in the communications paths between clients and the first and the second data systems. A chunk of data to be migrated from the first data system to the second data system is represented by a bit map identifying the data that has been transferred, and the bit maps of each of a group of storage processors of the plurality of storage processors performing the migration is maintained coherent across the storage processors. The migration process permits read and write access to the data during the migration process.

14 Claims, 5 Drawing Sheets

METHOD AND APPARATUS FOR DATA MIGRATION

TECHNICAL FIELD

The present application may relate to the storage of digital information.

BACKGROUND

Data management systems find a broad field of applications in modern life. These range from on-line data processing (OLDP), to data mining, to email and the like. All of such applications share the property that the amount of data that needs to be stored, and which may need to be accessed, increases with time. Moreover, the technologies used for transmitting, processing, storing and displaying such data have undergone, and continue to undergo substantial evolution during the practical lifetime of a system or operations concept.

Another evolving requirement is the necessity for such system to be both highly reliable and highly available. Systems now have redundant components, automatic backups, automatic failover of components and the like, so as to achieve these goals. These are particularly important in enterprise environments, in cloud computing and elsewhere where contractual quality of service (QoS) standards need to be met in order to avoid economic loss, frustration of web users, and lack of timely results.

Over a period of time, systems may exhaust their initial memory or computing capacity, exceed the capability of data communications links and experience other bottlenecks. This may result in the need to replace, upgrade, or augment the equipment used to provide the service. Changes in the configuration of a system may result in the need to interrupt the operation of one or all of the applications being service by a system in order to accomplish the necessary changes. This is an undesirable consequence, and should be minimized or obviated. How often have we seen a message on a browser to the effect that the system is unavailable due to "scheduled maintenance." More often, the system is unavailable and no explanation is provided.

SUMMARY

A system and method for managing the storage of data in a data storage system, having a first data storage system and a second data storage system is disclosed. A plurality of storage processors may be disposed in a communications fabric between a client processor and the first data storage system and the second data storage system. The storage processors have at least functional coherency links A group of the plurality of storage processors may configured to migrate data stored in a range of data addresses of the first data storage system to the second data storage system such that the client processor can access data stored in the range of data addresses of the first data system during the time that the data stored in a range of data addresses in the first data system is being migrated to the second data system.

In an aspect the data stored in the first data system and the second data system may be accessed by logical unit number (LUN) and logical block address (LBA) The data of a LUN may be migrated in chunks comprised of a range of contiguous LBAs and the migration status of the chunks may be represented by a bitmap. A bit of the bitmap representing a chunk of data of the chunks of data may be set when all of the data of the chunk has been migrated to the second data system. A set bit of the bitmap is reset when a write command addressed to an LBA within the chunk is received, and the data of the write command may be written to the first data system and to the second data system. The data of a chunk may be migrated in monotonically increasing LBA order within the chunk.

In another aspect, an unset bit of the bitmap is maintained as unset if a write command addressed to an LBA within the chunk is received, and the data of the write command is written to the first data system.

The bitmap may be evaluated after completion of a migration iteration and chunks that have been migrated eliminated from the bitmap and the remaining chunks that have not been migrated divided into sub-chunks. The data extent of the sub-chunks may be reduced after completion of a migration iteration.

In yet another aspect, convergence of the data migration process is evaluated by determining the rate of reduction in a number of unset bits in the bitmap and when such rate has reached a preset lower value, client write commands may be inhibited and a remainder of the data of the LUN is migrated to the second data system. Situations are envisaged where all of the data selected for migration is migrated in a single iteration of the migration process, and such an instance results in completion of the data migration process without inhibition of write operations or interrupting the user application.

Once the migration process is completed the LUN that has been migrated may be provisioned as associated with the second data.

During the migration process, each storage processor allocated to the migration process maintains a bitmap representing the state of the data within a chunk of data being migrated and changes to a bitmap of each storage processor are maintained coherent with that of the other participating storage processors. Maintenance of the coherence may use coherence communication links between the processors.

A method of managing a data storage system where data is to be migrated from one data storage system to another, may include the steps of: disposing a plurality of storage processors in a fabric between a client processor, a first data storage system and a second data storage system; and migrating an address range of data stored on the first data storage system to the second data storage system while providing access to the data on the first data storage system for reading and writing data.

In an aspect, the step of migrating may include: selecting the address range of the data and dividing the address range into a plurality of portions; representing each portion by a bit in a bitmap; performing a migration iteration by: transferring a portion of the plurality of portions from the first data system to the second data system; setting the bit in the bitmap when the portion has been transferred.

In an aspect, whether a write command is directed to a portion of the address range being migrated is determined and: if the address is not in the portion of the address range being migrated, writing the data to the first data system and the second data system; or, if the address is in the portion of the address range being migrated: resetting the bit representing the portion if the bit is set; or, maintaining an unset bit; and, writing the data to the first data system.

In yet another aspect, the status of the bitmap after an iteration of the migration step is evaluated and eliminating bits representing portions that are completely migrated. A next bit map is formed comprising bits representing portions of the address range that have not been completely migrated and dividing each portion into sub-portions. Data is migrated in accordance with the next bit map.

Synchronization may be maintained between the bit maps of at least a group of the plurality of storage processors in response to a received write command addressed to data within the range of the bit map using the coherency links.

In still another aspect, convergence of the migration process may be determined by one of: (1) determining that all of the bits in the bitmap have been set; or, (2) determining that a rate of decrease in unset bits of a sequence of bitmaps representing iterations has reached a predetermined lower limit. If the process has converged in accordance with test (1), associating the migrated address range is associated with the second storage system; or, if the process has converged in accordance with test (2), inhibiting write operations to the address range and migrating the remaining portions of the address range. The step of inhibiting write operations may be by pausing the client processes accessing the address range or by buffering write operations in a cache in the storage processors.

A computer program product is disclosed, the product being stored on a non-transient computer readable medium and including instructions configuring a processor to perform the steps of: migrating an address range of data stored on the first data storage system to the second data storage system while providing access to the data on the first data storage system for reading and writing data. The step of migrating, may include selecting the address range of the data and dividing the address range into a plurality of portions; representing each portion by a bit in a bitmap; performing a migration iteration by: transferring a portion of the plurality of portions from the first data system to the second data system; setting the bit in the bitmap when the portion has been transferred; determining if a write command is directed to a portion of the address range being migrated.

If the address is not in the portion of the address range being migrated, the data may be written to the first data system and to the second data system. If the address is in the portion of the address range being migrated, the bit representing the portion is reset if the bit is set; or, an unset bit is maintained as unset and the data is written to the first data system.

DESCRIPTION

Exemplary embodiments may be better understood with reference to the drawings, but these examples are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

Figure 1:
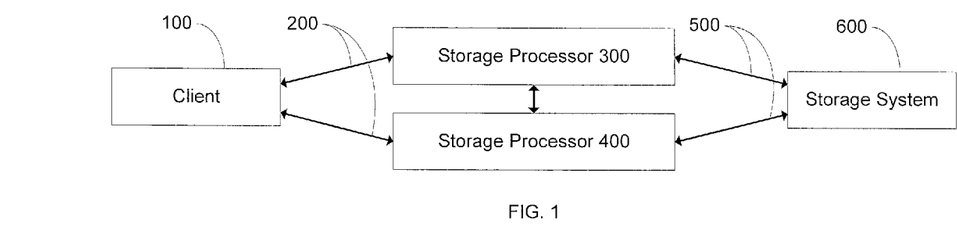
FIG. 1 shows a system comprising a storage processor connected by a fabric to a client and a storage system.

FIG. 1 shows a simplified block diagram of an existing data processing system comprising a client 100, two or more storage processors 300, 400 and storage media 600. Communications links 200 exist between the client 100 and the storage processors 300, 400; communication links 500 exist between the storage processors 300, 400 and the storage media 600. In this configuration there is no requirement for the client 100 the storage processors and the storage media 600 to be physically co-located. The nature of the communications links 200 and 500 depends on the data volume, transmission speeds and transmission distance, and each of the links may have different properties. For example, communications links 200 may be part of a wide area network (WAN) while communications links 500 may be part of a local area network (LAN) and a variety of transmission protocols may be used, including the TCP/IP, Ethernet, iSCSI, Fiber Channel or any data transmission protocol that meets the design requirements of the particular system. As such protocols are continually evolving, a person of skill in the art would appreciate that additional protocols may be developed, or existing protocols modified without compromising the concepts described herein. Such additional protocols may be either wired or wireless. Direct attached communications paths such as PCIe may also be used for any of the communications links 200, 500. The communications links 200, 500 may be a storage fabric, which may be a switched network and not all of the available communications paths are shown in FIG. 1 or subsequent figures.

Two storage processors 300, 400 are shown, however a plurality of storage processors may be used so as, for example, to increase system bandwidth or provide additional redundancy. The storage processors may have a scalable property such as described in commonly assigned patent application Ser. No. 11/365,474, filed on Feb. 28, 2006, entitled "Method and Apparatus for Providing High-Performance and Highly-Scalable Storage Acceleration" or configured to provide caching, data de-duplication services and data compression services, as examples of functionality. The storage processors are shown individual elements of the system. However, a person of skill in the art would appreciate that these functions may be allocated to a number of modules, or the functions of a number of modules combined without departing from the concepts described herein.

The client 100 may be a plurality of clients, some of which may be collocated, and the communications link 200 may be selected from one or more communications protocols and transport mechanisms. The storage media 600 may be a plurality of storage media, which may be individual disks, systems of disks, solid state memory, tape, or the like. Where a plurality of storage media are used, the storage media may be heterogeneous. That is, a variety of storage media types may be used for various instances of the storage media 600 and the connection links 500 may be selected in accordance with system design criteria which may be appropriate for a particular use case, in a manner analogous to the connection links 200.

Figure 2:
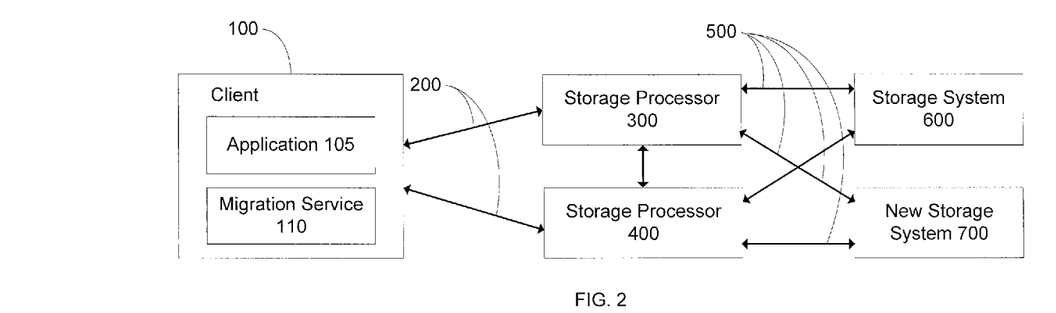
FIG. 2 shows the addition of additional storage systems to the system configured to migrate data from the pre-existing storage system to the additional storage system.

When the storage media 600 is expanded in capacity, or the type of storage media is changed due to a technological advance, or the like, data stored on the storage media 600 may need to be moved, or migrated, to the newly installed media. The need for data migration may arise without having changed the media type where the storage media needs to be replaced due to wear out, incipient failure, preventive maintenance or other similar occurrences. FIG. 2 shows a configuration which may permit the migration of data from storage media 600 to storage media 700. Storage media 700 may not necessarily be of the same technological type or era as storage media 600; the communication links 500 between the storage processors 300 and 400 and the storage media 600 and storage media 700 may use different protocols and transport mechanisms.

The configuration of the storage processors 300, 400 shown in FIGS. 1 and 2 may be either active-active or active-passive. In an active-active configuration, the data may be routed between the clients 100 and the storage media 600, 700 through either of the storage processors 300, 400. This is facilitated by additional communications links 500 as shown in FIG. 2, or through a switched network fabric as is known in the art. In an active-passive configuration, one of the storage processors 300, 400 (e.g., 300) is being used to communicate between the client 100 and the storage media 600, 700, whereas the other storage processor (400) is operating, but not serving as a data path.

In the active-active configuration, data flows through a plurality storage processors (e.g., 300, 400). Since each of the storage processors 300, 400 may independently communicate between the clients 100 and the storage media 600, 700, coherency needs to be maintained. That is, each of the storage processors capable of communicating with a particular media device needs to keep an account of all changes to the data that is stored, regardless of the storage processor being used in the path between the client and the storage media or the destination storage media. This is accomplished using a communications link between the storage controllers, which may be any suitable communications link protocol. The communications link may operate over a switched network fabric if such is available.

Where the active-active configuration is used, data may be transmitted between the client and the storage media through any storage processor having a communications path between the storage processor, the client and the storage media. Should a storage processor 300, 400 fail, a remaining operable storage processor has all of the data and state information to maintain coherency and connectivity between the client and the storage media.

In an active-passive configuration, two or more storage processors are connected as described above, however the data flowing between a client and a storage media flows through the active storage processor. The passive storage processor needs to be fully aware of the actions being taken by the active processor so as to maintain coherency. But, changes to the data and state information in the passive storage processor arise only from actions taken by the active processor. This is a simpler process to manage than the active-active configuration where changes to the data and the state information may arise due to actions taken independently be each of the storage processors in response to requests from the client. However, the amount of processing resources that may be allocated to the migration process is reduced.

When an additional storage media 700 is included in the system configuration, as in FIG. 2, data resident on storage media 600 may need to be transferred from storage media 600 to storage media 700, either in whole or in part. Where storage media 700 is a new generation of storage media, this may result in improved performance, and the storage media 600 may be retired from service. Migration of data from storage media 600 to storage media 700 may be performed by duplication of the data stored on storage media 600 to storage media 700. A duplication service 110 operating on the client whose application 105 is managing the data may be used to control and manage this migration. This operation may require that modification of the data be suspended during the period of migration. Typically this may result in suspending the execution of the application during the transfer time period.

Figure 7:
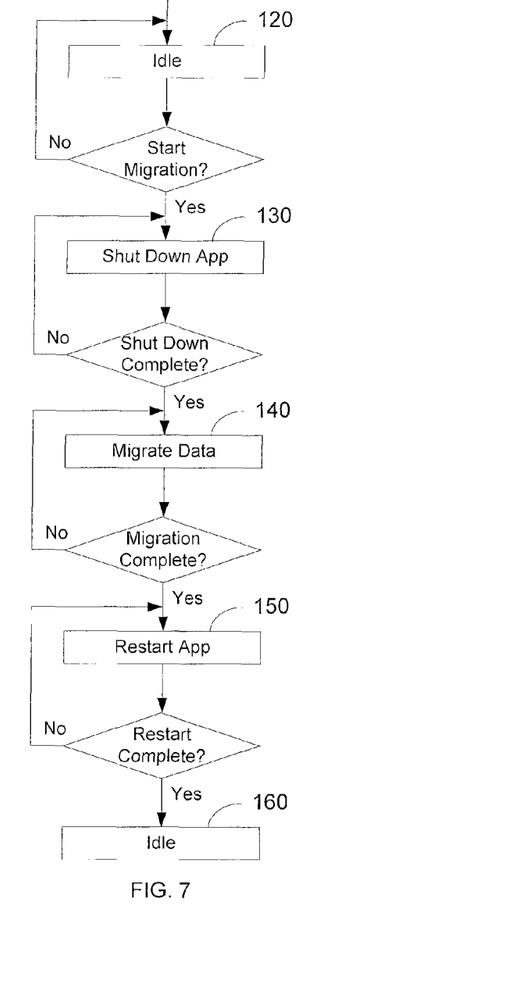
FIG. 7 shows a flow chart of a portion of a migration service which may execute within a client environment.

The process may be understood with reference to FIG. 7, where the migration process starts from an idle state 120 and loops until the data migration operation is initiated. The using application is shut down 130 and once this step has been completed in an orderly manner, the data is migrated 140 by copying the data from storage media 600 to storage media 700. Since these operations execute through storage processors 300, 400, coherency is maintained in accordance with the migration service 110. Once all of the data is migrated, the user application 105 may be restarted 150 and the migration process returns to an idle state 160.

Figure 9:
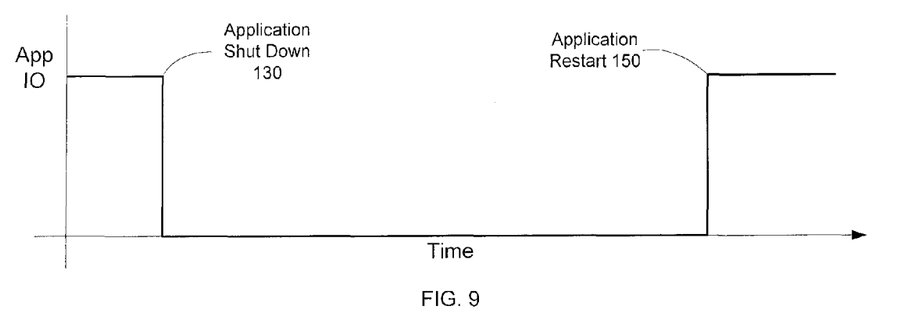
FIG. 9 is a conceptual representation of the input/output activity during the operation of the migration service of FIG. 7.

The effect of the migration process on system performance is shown schematically in FIG. 9. Since the application program is suspended during the interval between the application shut down 130 and the completion of the application re-start, the performance of the application is adversely affected. The representation of the relative performance of the application before and after the date migration is schematic and not quantitative. The performance may be the same when the data is migrated to a storage media of the same technology and era as the storage media from which the data is being migrated. Often a higher performance storage media may be used as a replacement, and the application input-output performance may be enhanced. Apart from storage capacity increases, the application performance may be an important consideration, particularly when the performance of the application is limited by the input-output capability of the storage media.

Figure 3:
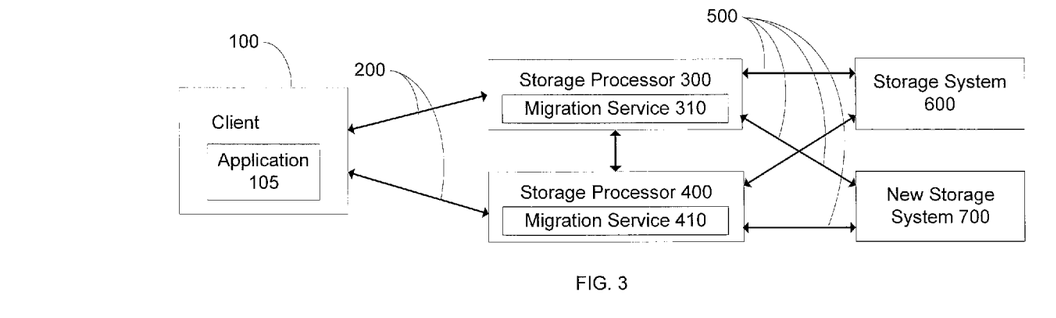
FIG. 3 shows the migration being performed by a plurality of storage processors having a coherence property.
Figure 4:
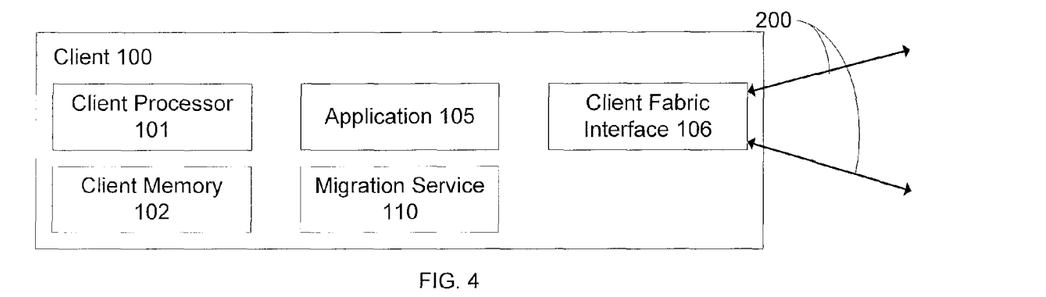
FIG. 4 shows a client having an interface to the fabric and a migration service application.
Figure 5:
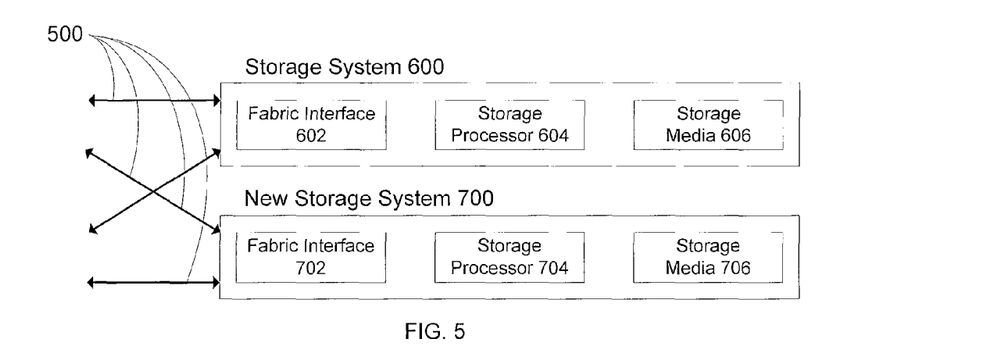
FIG. 5 shows the storage systems having an interface to the fabric and storage processors.

FIG. 3 is a schematic representation of a system where the migration service is managed by a duplication service 310, 410, located at storage processors 300, 400, respectively. This service may be operable with either active-active or active-passive configurations.

Figure 8:
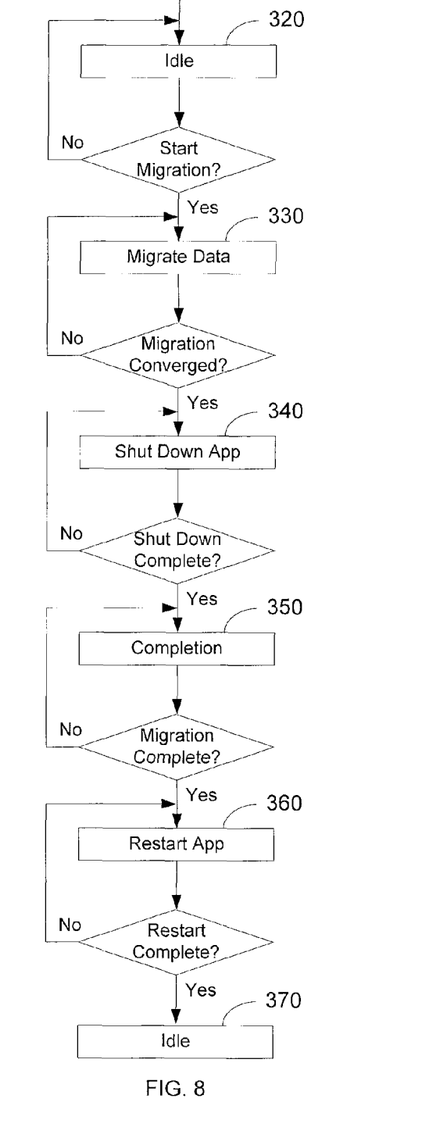
FIG. 8 shows a flow chart of a portion of a migration service which may execute within a storage processor environment; from FIG. 3

FIG. 8 illustrates an example of the process. The migration process begins in an idle state 320, and when a migration operation is performed, the data is migrated 330 without shutting down the application, until the migration process has converged. The application continues to operate until the migration operation convergence event occurs and the application is shut down 340. After completion of the shutdown operation of the application 340, remaining steps in the data migration process are performed so that the data migration process has been completed and the application may be restarted 360 and the process returned to an idle state 370. The application may not be shut down for the completion of the migration if the convergence criteria are that all of the data has been migrated. Moreover, a buffer may be used to cache data changes made during the completion of the data migration process, if shut down of the application is desired to be avoided.

Figure 10:
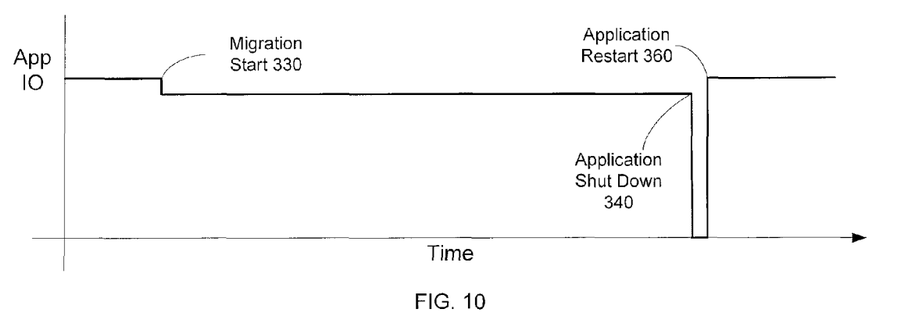
FIG. 10 is a conceptual representation of the input/output activity during the operation of the migration service of FIG. 8.

A process of data migration and convergence will be described presently. FIG. 10 shows the performance of an application where data migration convergence is employed. When the migration process 300 starts, there is usually a change in application performance. When the data migration process has converged and the application is shut down 340, the application performance is the same as that for the process of FIG. 8, except that the down time is considerable shorter. After the migration completion process 350 is finished, the application may be restarted 360. The application performance after restart would be expected to be the same or substantially the same for the processes of FIG. 7 and FIG. 8 once completed as the same application will be operating on data stored on the same media. The difference is the impact on availability of the system. Some differences in performance may be observed, but these would potentially be due to the specific placement of the migrated data on the storage media 700 by the duplication service 110 as compared with the duplication services 310 and 410.

The various time durations shown in FIGS. 9 and 10 are representative only, and the actual migration times for each of the processes may take different times, but the down time difference is likely to be significant.

During the period between the migration start 330 and the application shut down 340, the application performance is likely to change. For example, as data is transferred from storage media 600 to storage media 700, the performance of the application may increase as more of the data is transferred to storage media 700, providing that storage media 700 is a higher performing storage media that the storage media 600 from which the data is being transferred.

Figure 6:
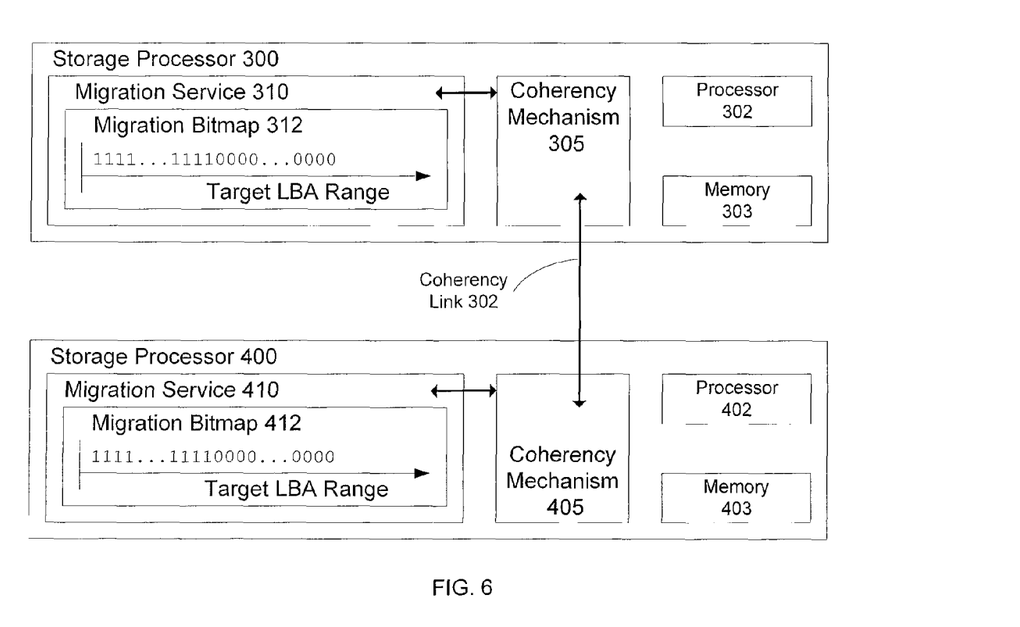
FIG. 6 shows functional aspects of the storage processors where a coherency mechanism is employed.
Figure 11:
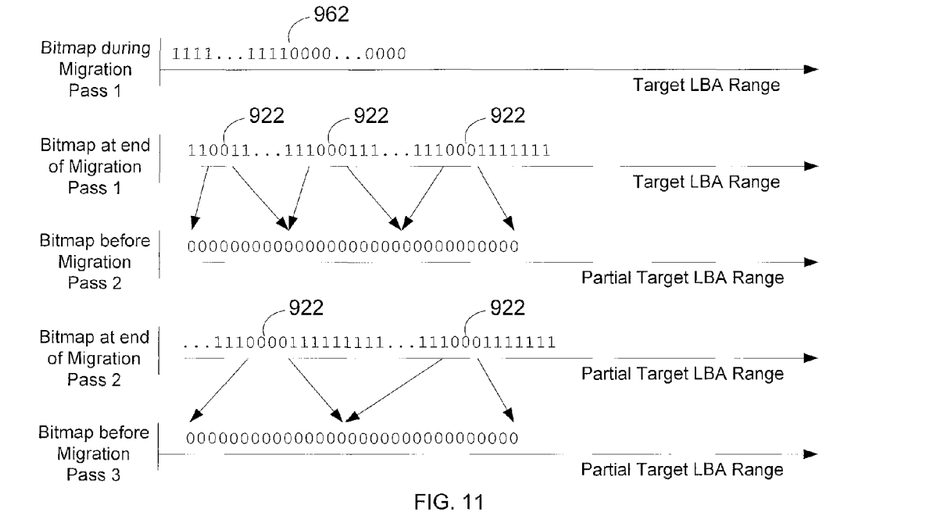
FIG. 11 shows an example of the state of a bitmap during representative stages (passes) of the migration process.

The migration processes 310 and 410 may comprise a migration bitmap 312, 412 and a coherence mechanism 305, 405 in each of the storage processors 300, 400, respectively, engaged in performing the migration process (see FIGS. 6, 11). Other methods of managing the accounting for the transfer of data between the storage media 600, 700 would be apparent to a person of skill in the art having the benefit of this disclosure.

The bitmaps 312, 412 may represent the data being migrated, where a "1" signifies that the data has been migrated to the new media and a "0" signifies that the data still needs to be migrated. A plurality of bitmaps may be established and independently processed by different threads of a process. Each bitmap may represent, for example, an extent of memory that is in the process of being migrated. The extent may be described in terms of physical memory addresses or in terms of logical memory addresses. The latter may be used, for example, when memory is allocated to applications or groups of applications using abstractions such a volume, a logical unit number (LUN) a logical block address (LBA), a data page or sector number or the like. When abstractions are used, the physical location of the data the storage media 600 that is to be migrated, and the physical location of the migrated data on storage media 700 may be determined by levels of indirection, and the physical structure of the storage media may not be relevant. So, the storage media may use such concepts as RAID, a flash translation layer (FTL), or other means for determining the physical location of the data, without changing the nature of the migration process.

Figure 12:
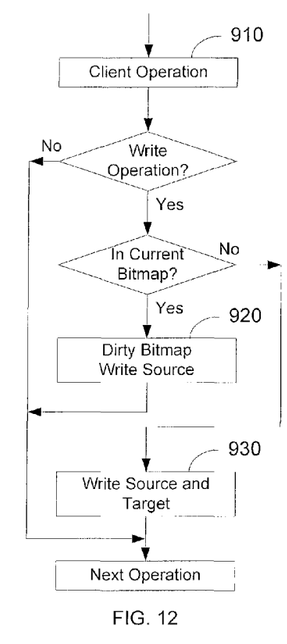
FIG. 12 shows an example of a method of processing client initiated storage operations during the operation of migration services of FIG. 3.
Figure 13:
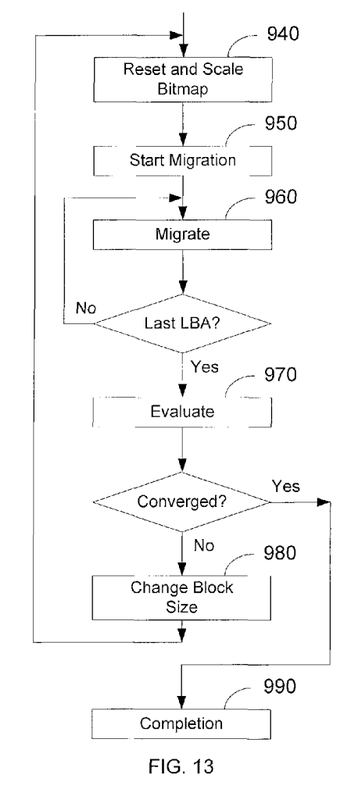
FIG. 13 shows an example of the initialization and change to the bitmaps of FIG. 6 for each iteration (pass) of the migration services of FIG. 3.
Figure 14:
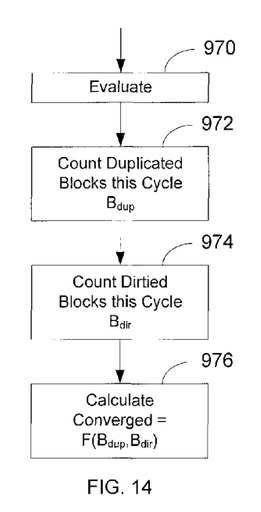
FIG. 14 shows an example of determining whether the migration process has converged at the end of an iteration (pass) of the migration services FIG. 3

Since a LUN is often related to one or more processes or user applications having access to the data stored in the LUN logical memory space, an example chosen for discussion here is the migration of the data stored in a LUN The process may be understood with reference to an example shown in FIGS. 12-14.

An example of the iterative process is shown in FIG. 13. At the outset, the bitmaps may have an extent equal to that of the LUN, which may be divided into, for example, chunks of contiguous LBAs, each chunk or portion being represented by a corresponding bit of the bitmap (state 910). When the duplication process starts 950, the process, or a thread thereof, begins stepping through the contents of the chunks, transferring all of the LBAs of the chunk from the source storage media to the destination storage media, thus migrating the chunk of data. The state of the bit in the bitmap would be changed from "0" to "1" indicating that the chunk has been transferred or migrated. As shown in FIG. 11, the lower bits (left hand end) of the bitmap, representing migrated data are "1" and the higher bits, representing data as yet not transferred, have a "0" state.

In the first pass of the process, each bit may represent a selected size data extent (e.g., 1 GB) of the total range of data being transferred (e.g., 2 TB). At the conclusion of the first pass, all of the bits in the bitmap would have been "1" if the data had been transferred completely, and none of the data in a transferred data extent had been subsequently modified. However, since access to the data being transferred is not being interrupted, the data can be both read and written. Where data has been written, the data values in the source data storage system may differ from the data in the destination data system. This may arise when the data being transferred is not interrupted so as to write newly changed data to the destination data system out of sequence, as this may slow down the migration process.

In an aspect, where the newly modified data may be written to both the source and destination data systems, the bit of the array, once set, need not be reset as the data will have been written to both the source and the destination media.

After completion of the first pass of the migration process, some of the bits are "1" and some are "0". A new bitmap is initialized, having all "0", where each "0" of the preceding bitmap is now represented by a plurality of "0" representing a smaller range of the data (e.g., 1 GB) that has not as yet been completely transferred without subsequent modification and that is now being divided into smaller contiguous intervals (e.g., 1 MB). Again, the data represented by the new smaller range of contiguous intervals may now be transferred in another pass of the migration process, and the bitmap altered as previously described.

The migration process 960 continues until the desired LBAs have been transferred, or the process is considered to have reached a state of convergence where further iterations of the migration process are of limited value. The migration process uses the coherency mechanisms 310, 410 to ensure that the states of tables 312, 412 are the same. Depending on the specific approach adopted to maintain coherency, the migration of a specific data may be performed by one of the storage processors, or a plurality of the storage processors.

Coherency between the operations of a plurality of storage processors may be maintained through a number of communications media and protocols. Examples of coherency links include Ethernet cables, Infiniband cables and other interconnects capable of providing data transmission between storage processors. Examples of protocols utilized over these links may include IP protocol, RDMA or any protocol, including a switched network fabric, available to the operating systems within each storage processor. Alternatively such processors may be in a common chassis and a local bus, including PCIe may be used.

The coherence mechanism may verify that both bitmaps have the same state for a particular data location so that data written to a particular data location in the source media that has already been transferred to the destination media may be recognized, and the bitmaps of the migration services may be synchronized. Generally, the bitmaps would be in the same state, except for situations where a data migration has taken place shortly before a data modification to a same memory location.

The coherency protocol may be expected, but is not required, to provide guaranteed delivery of data or some fault tolerance to minimize the effects of lost or corrupted messages between storage processors. Additionally, the coherency interconnect may be expected, but not required, to provide resiliency against physical failures of the coherency link including interface failure, cabling damage or other failure rendering communication between storage processors degraded.

When the last LBA in the iteration has been migrated, the bitmap is evaluated to determine if the migration process is converged. A simple example of the convergence of a migration process is that all of the bits in the relevant bitmap are logical "1". This could occur if no data was written to or modified in the address space of the LUN during an iteration of the migration process. At this juncture, the data in the source and the destination storage media would be identical, and the application program could now begin to reference the data in the destination storage media and the data in the source storage media could be abandoned. A convergence state exists at the end of any iteration when all of the bits in the bitmap are "1".

However, since the application program 120 (which may be a plurality of application programs) has access to the LUN and may be permitted to modify data or write new data to the LUN, the data set may have changed during the scan of the LUN by the migration process.

The act of requesting a function to be performed on the data stored in the source storage media may be termed a client operation 910, and such operations may be, for example, a read operation or a write operation. Read operations do not change the stored data referenced by the LBA being read and the migration process is immediately available to process a next client operation 910. Where a write operation is to be performed, the process determines if the write operation relates to an LBA in a chunk of the bitmap representing data currently being migrated. If the write operation is directed to an address not currently represented in the bitmap, the relevant data has either not as yet been migrated, or the relevant data has already been migrated and the portion of the LUN represented by the address of the data is no longer in the bitmap. In the first pass, all of the LBA addresses in the LUN would have been represented in the bitmap. However, this may not be the case in later iterations of the process.

So, the write operation for a LBA of a LUN that is not represented in the bitmap may be performed on both the source and the destination (target) data media. Thus, wherever the data is expected to be located on the storage media by the application program, the location(s) have the correct data. When the write operation is directed towards a LBA that is represented in the current bitmap, the data for the particular extent is in the process of being migrated. Either the particular data of this extent has already been migrated, and a write to the target storage media will change the data, or the data has not been migrated, and data written to the target storage media would be later overwritten by older, and usually invalid data, when the data for that LBA is later migrated from the source to the destination storage media.

Such data corruption is prevented by changing the state of the chunk containing the LBA in the bitmap from "1" to "0" if the state was "1", and maintaining the state "0" if the state was "0". This may be termed "dirtying" the bitmap. The data associated with the write operation is written to appropriate LBA on the source data media. The coherency mechanism 305, 405 ensures that the change is made to all of the relevant bitmaps. When a write operation has occurred within the address range of the bitmap and the data had already been migrated, the data has been modified and this is represented by the change in bit state. In the present example, the LBA data is being transferred in monotonically increasing LBA order, so a write operation would cause a "0" value to appear in the portion of the bitmap having "1" values. The portion of the bitmap that has not been scanned as yet remains populated with "0"s even if the write operation was performed to an LBA represented by that portion of the bitmap. The data written to the source media will be migrated successfully later when the associated LBA subsequently scanned and written to the destination media.

Hence, when write operations are performed on LBAs of chunks of data in the current bitmap, the evaluation step 970 may determine that not all of the bits in the bitmap have been set during the immediately preceding iteration, and that not all of the current data has been transferred from the source data media to the target data media. The migration process would need to continue to migrate the remaining data represented by the "0" entries in the bitmap by making another pass with the updated bitmap. However, at the end of the pass, one expects that a significant quantity of data has been migrated. Eliminating the chunks of transferred data from the bitmap obviates the need to migrate that data again. From iteration-to iteration of the migration process the size of the chunks is reduced so that chunks tend to represent un-migrated data while migrated data are no longer represented in the bitmap. When the chunk is not in the bitmap, the write operation 930 is performed on both the source data media and the target data media and the stored data remains coherent between the source media and the destination media until the migration process is complete.

A number of strategies may be employed to exclude the data already migrated from the current bitmap. In an example, one can identify those chunks previously migrated by using the state of the bitmap at the completion of the scan, and use this bitmap to select the chunks that still need to be migrated, as they had experienced write operations during the previous scan. So, the previous bitmap may be used to determine whether the write operation references a LBA that is in the process of being migrated, and this decision is used to proceed to state 920 or 930.

A scan for migration 950 may be initiated using the bitmap from the previous scan to identify chunks of data that need to be migrated in order for the scan to converge on a completely migrated LUN. Each of the identified chunks may be subdivided into sub-chunks having, for example, a continuous LBA range such that the sub-chunks represent the newly specified chunk being migrated. The migration process may be performed on the identified chunk, where the sub-chunks are identified as being in a new current bitmap. If the migration of a chunk is now successfully completed (that is all of its bits are "1"), the associated chunk bit in the previous scan bitmap may be set to "1" so that subsequent write operations are processed by step 930 rather than step 920. Such a hierarchy of bit maps is an example of a method of keeping track of migrated and un-migrated data.

Alternatively, each of the chunks identified by "0" in the previous scan bitmap may be processed by dividing into sub-chunks and the evaluation process 970 performed after all of the sub-chunks are processed in increasing LBA order. Those chunks that have now been processed and for which a subsequent write operation has not been performed will be identified as having all of the sub-chunk bits set to "1". All of those chunks may now be set to "1" in the higher order table and the new scaled bitmap 940 used during a subsequent scan. At any point where all of the bits in the highest level bitmap are "1" the evaluation step 970 would determine that the migration process for the LUN, as an example, has successfully completed 990.

However, the last stages of a migration process may be inefficient for a heavily used data base. A particular chunk, sub-chunk or LBA of a LUN may be so heavily used that the scan would have to be sub-divided down to the LBA level in order to finish the migration prior to the next write operation. This could be done if the user application cannot be interrupted.

Resources are often better employed by determining that progress in migration has slowed to the extent that a brief interruption in the application 120 may be desirable so as to permit the remaining migration to be completed without interference by write operations to the sub-chunk or LBA being migrated.

Convergence, therefore, may be determined by absolute convergence, or by measuring the rate of progress of the convergence process and determining that the application program should be interrupted so that absolute convergence can be rapidly be realized from the current state of the migration.

Various methods of measuring the rate of convergence, including the number of remaining chunks, sub-chunks or LBAs, the estimated amount of time to complete the migration absent write operations, or the rate of approach to convergence.

FIG. 14 shows an example of evaluating the rate of convergence. The evaluation of convergence 970 may determine the number of blocks, where a block (e.g., LBAs) is the unit of measure for this cycle of the process, that have been migrated 960 and the number of blocks that have been written to (bit table dirtied 920) during the iteration of the process that has just concluded. Generally the distribution of write operations to LBAs of the LUN will be non-uniform and the distribution will generally change with time. But, the process for migration may not be privy to this information as the write pattern depends on the dynamics of the using application program. Nevertheless, the migration process will be expected to complete for at least some of the chunks of the LUN and for at least some of the sub-chunks when the block size is reduced in subsequent iterations of the process. A measure of success may be, for example a ratio of the number of blocks in the bitmap that have been migrated during the pass 972 to the number of bits in the bitmap that have been dirtied during the pass 974.

As the iterations of the process proceed, blocks that have been successfully migrated in the previous will accept writes with no further migration required, leaving only the writes to the un-migrated blocks remaining. To the extent that the un-migrated blocks represent a local hot spot for data writing, the convergence of the process will slow, and may finally effectively halt if the writes occur at comparable rates to the migrations 976. More importantly, the rate of convergence may slow to the point that it is more efficient to proceed to completion by briefly interrupting the process as shown in FIG. 10. This may be represented by a function of the blocks migrated during the completed iteration, the bits dirtied in the previous iteration, the block size, the estimated time to complete the migration of the blocks represented by the dirtied bits, or the like. A variety of such decision policies may be established, and one or more of such policies used for any particular migration operation. A person of skill in the art, after evaluating the performance of this system for typical data migration operations would be able to set quantitative limits on the decision criteria, taking account of the interruptability characteristics of the applications accessing the data that is being transferred, the amount of buffer memory available, and the like.

In another alternative, the completion steps of the migration process may be performed by providing a buffer where the newly written data that is represented in the current bit map is cached in, for example, the storage processors 300 so that the current data may be maintained for the period of completion of the migration.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP or array processor, or the like, that acts on the instructions to perform functions described herein. Alternatively, the operations might be performed by specific hardware components that may have hardwired logic or firmware instructions for performing the operations described, or by any combination of programmed computer components and custom hardware components, which may include analog circuits. The functions of the client 100, the storage processors 300, 400 and some of the functions of the storage media 600, 700 may be performed by either general purpose computing hardware executing a stored program, or by special purpose hardware with firmware programming. Special purpose hardware may include field-programmable gate arrays (FPGA), application specific integrated circuits (ASIC), or the like.

The methods may be provided, at least in part, as a computer program product that may include a non-volatile (non-transient) machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions or data for execution by a computing machine or special-purpose hardware and that may cause the machine or special purpose hardware to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose to store the instructions during the period of performance thereof.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

While the methods disclosed herein have been described and shown with reference to particular steps performed in a particular order, it will be understood that these steps may be combined, sub-divided, or reordered to from an equivalent method without departing from the teachings of the present invention. Accordingly, unless specifically indicated herein, the order and grouping of steps is not a limitation of the present invention.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention.

What is claimed is:

1. A system for managing the storage of data, comprising:
a first data storage system and a second data storage system;
a plurality of storage processors disposed in a fabric between a client processor, and the first data storage system and the second data storage system, the storage processors having coherency links operable during a time period when data is migrated from the first storage system to the second storage system;
wherein a group of the plurality of storage processors are configured to migrate data stored in a range of data addresses of the first data storage system to the second data storage system such that the client processor can access data stored in the range of data addresses of the first data system during the time period when data is migrated and the migration is performed iteratively; and, wherein data stored in the first data system and the second data system is accessed by logical unit number (LUN) and logical block address (LBA); a bitmap is evaluated after completion of a migration iteration and chunks that have been migrated are eliminated from the bitmap and the remaining chunks that have not been migrated divided into sub-chunks having a reduced extent; and, when a rate of reduction in a number of unset bits in the has reached a preset lower value, client write commands are inhibited and a remainder of the data of the LUN is migrated to the second data system.

2. The system of claim 1, wherein the data of a LUN is iteratively migrated in chunks comprised of a range of contiguous LBA and the migration status of the chunks is represented by a bitmap.

3. The system of claim 2, wherein a bit of the bitmap representing a chunk of data of the chunks of data is set when all of the data of the chunk has been migrated to the second data system.

4. The system of claim 3, wherein a set bit of the bitmap representing the chunk of data is reset when a write command addressed to an LBA within the chunk being migrated is received, and the data of the write command is written to the first data system and the second data system.

5. The system of claim 3, wherein an unset bit of the bitmap representing the chunk of data is maintained as unset if a write command addressed to an LBA within the chunk being migrated is received, and the data of the write command is written to the first data system.

6. The system of claim 3, wherein the data of a chunk is migrated in monotonically increasing LBA order within the chunk.

7. The system of claim 1, wherein the LUN is provisioned as associated with the second data system after completion of the migration of the LUN.

8. The system of claim 2, wherein each storage processor maintains a bitmap and changes to a bitmap of each storage processor is maintained coherent with that of the other storage processors.

9. The system of claim 8, wherein the coherency links are configured to update the bit maps of the group of the plurality of processors performing the data migration.

10. A method of managing a data storage system, comprising:
disposing a plurality of storage processors in a fabric between a client processor, a first data storage system and a second data storage system;
iteratively migrating an address range of data stored on the first data storage system to the second data storage system while providing access to the data on the first data storage system for reading and writing data;
determining if a write command is directed to a portion of the address range being migrated and:
if the address is not in the portion of the address range being migrated, writing the data to the first data system and the second data system; or
if the address is in the portion of the address range being migrated:
resetting the bit representing the portion if the bit is set; or,
maintaining an unset bit;
and writing the data to the first data system;
evaluating the status of the bitmap after each migration iteration step and eliminating bits representing portions that are completely migrated;
initializing a next bit map comprising bits representing portions of the address range that have not been completely migrated and dividing each portion into sub-portions;
maintaining synchronization between the bit maps of at least a group of the plurality of storage processors in response to a received write command addressed to data within the range of the bit map using the coherency links;

migrating the data represented by the next bit map; and
determining whether the migration process has converged by one of:
(1) determining that all of the bits in the bitmap have been set; or
(2) determining that a rate of decrease in unset bits of a sequence of bitmaps representing iterations has reached a predetermined lower limit; and
if the process has converged in accordance with test (1), associating the address range with the second storage system; or
if the process has converged in accordance with test (2), inhibiting write operations to the address range and migrating the remaining portions of the address range.

11. The method of claim 10, wherein the step of inhibiting write operations is by pausing the client processes accessing the address range.

12. A computer program product, stored on a non-transitory computer readable storage medium, comprising:
instructions configuring a processor to perform the steps of:
migrating an address range of data stored on the first data storage system to the second data storage system while providing access to the data on the first data storage system for reading and writing client data, the step of migrating further comprising:
selecting the address range of the data and dividing the address range into a plurality of portions;
representing each portion by a bit in a bitmap;
performing a migration iteration by:
transferring a portion of the plurality of portions from the first data system to the second data storage system;
setting the bit in the bitmap when the portion has been transferred;
determining if a client write command is directed to a portion of the address range being migrated and:
if the address is not in the portion of the address range being migrated, writing the data to the first data storage system and the second data storage system; or
if the address is in the portion of the address range being migrated, resetting the bit representing the portion if the bit is set; or,
maintaining an unset bit; and
writing the data to the first data storage system,
wherein the rate of reduction in a number of unset bits in the bitmap is determined and when such rate has reached a preset lower value, client write commands are inhibited and a remainder of the data of the selected address range is migrated to the second data storage system.

13. A system for managing the storage of data, comprising:
a first data storage system and a second data storage system;
a plurality of storage processors disposed in a fabric between a client processor, and the first data storage system and the second data storage system, the storage processors having coherency links operable during a time when data is being migrated from the first data storage system to the second data storage system;
wherein a group of the plurality of storage processors are configured to migrate data stored in a range of data addresses of the first data storage system to the second data storage system such that the client processor can access data stored in the range of data addresses of the first data storage system during the time when data is being migrated; data stored in the first data storage system and the second data system is accessed by logical unit number (LUN) and logical block address (LBA); the data of a LUN is migrated in chunks comprised of a range of contiguous LBA; the migration status of the chunks is represented by a bitmap; the bitmap is evaluated after completion of a migration iteration; chunks that have been migrated are eliminated from the bitmap and the remaining chunks that have not been migrated divided into sub-chunks; the rate of reduction in a number of unset bits in the bitmap is determined; and, when such rate has reached a preset lower value, client write commands are inhibited and a remainder of the data of the LUN is migrated to the second data storage system.

14. A method of managing a data storage system, comprising:
a plurality of storage processors in a fabric between a client processor,
a first data storage system and a second data storage system;
migrating an address range of data stored on the first data storage system to the second data storage system while providing access to the data on the first data storage system for reading and writing data,
wherein, the step of migrating comprises:
selecting the address range of the data and dividing the address range into a plurality of portions;
representing each portion by a bit in a bitmap;
performing a migration iteration by:
transferring a portion of the plurality of portions from the first data system to the second data system;
setting the bit in the bitmap when the portion has been transferred;
unsetting the bit in the bit map if a client write request is in the portion being migrated;
determining a rate of reduction in a number of unset bits in the bitmap, and
wherein when the rate of reduction has reached a preset lower value, inhibiting client write commands and migrating a remainder of the data of the address range to the second data storage system; or
repeating the step of iterative migration if the preset lower has not been reached.

* * * * *